United States Patent [19]

Chu et al.

[11] 4,049,924
[45] Sept. 20, 1977

[54] PUSHBUTTON DIALS

[75] Inventors: Pak-Jong Chu; Jacques Marcel Audette, both of Ottawa, Canada

[73] Assignee: Northern Telecom Limited, Montreal, Canada

[21] Appl. No.: 688,381

[22] Filed: May 20, 1976

[51] Int. Cl.² .......................................... H04M 1/50
[52] U.S. Cl. ............................................. 179/90 R
[58] Field of Search ............... 179/90 R, 90 K, 2 DP; 240/365 R, 365 S; 200/5 R, 5 A, 159 R, 160, 159 A

[56] References Cited
U.S. PATENT DOCUMENTS

| | | | |
|---|---|---|---|
| 3,227,819 | 1/1966 | Winther | 179/90 K |
| 3,479,470 | 11/1969 | Ham, Jr. | 179/90 K |
| 3,626,409 | 12/1971 | Hill et al. | 179/90 K |
| 3,828,155 | 8/1974 | Adams | 200/160 |
| 3,963,879 | 6/1976 | Klaiber et al. | 179/90 K |

Primary Examiner—Thomas W. Brown
Assistant Examiner—Gerald L. Brigance
Attorney, Agent, or Firm—Sidney T. Jelly

[57] ABSTRACT

A pushbutton dial has a cover, a back member and a circuit member assembled in a sandwich formation, the cover supporting a plurality of pushbuttons arranged in columns and rows. Longitudinal and transverse shafts are mounted between the cover and back member, actuation of a pushbutton rotating a unique pair of longitudinal and transverse shafts. Frequency contacts are mounted on the back surface of the circuit member - usually a printed circuit board - and are actuated by pins passing through the back member and the circuit member one end of each pin in engagement with one set of frequency contacts and the other end of each pin in contact with a lever on one of the longitudinal shafts or one of the transverse shafts. The dial can also be provided with a new form of common switch comprising a series of cantilevered spring contacts mounted side by side and actuated by a cam member in a predetermined sequence.

10 Claims, 12 Drawing Figures

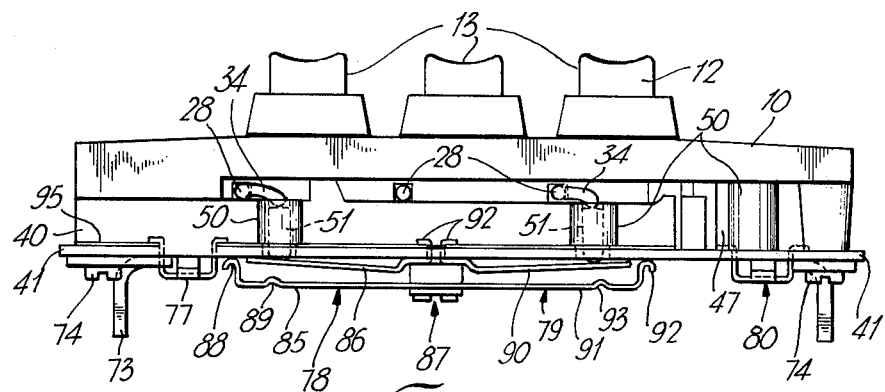
Fig-8-
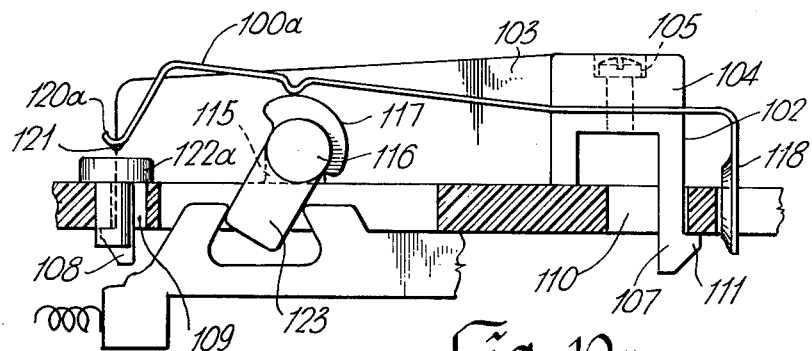
Fig-10-
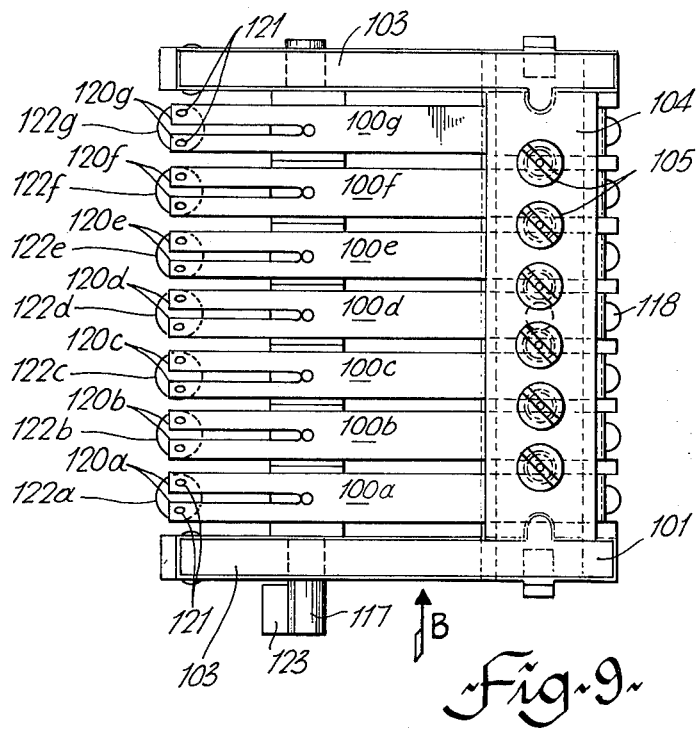
Fig-9-

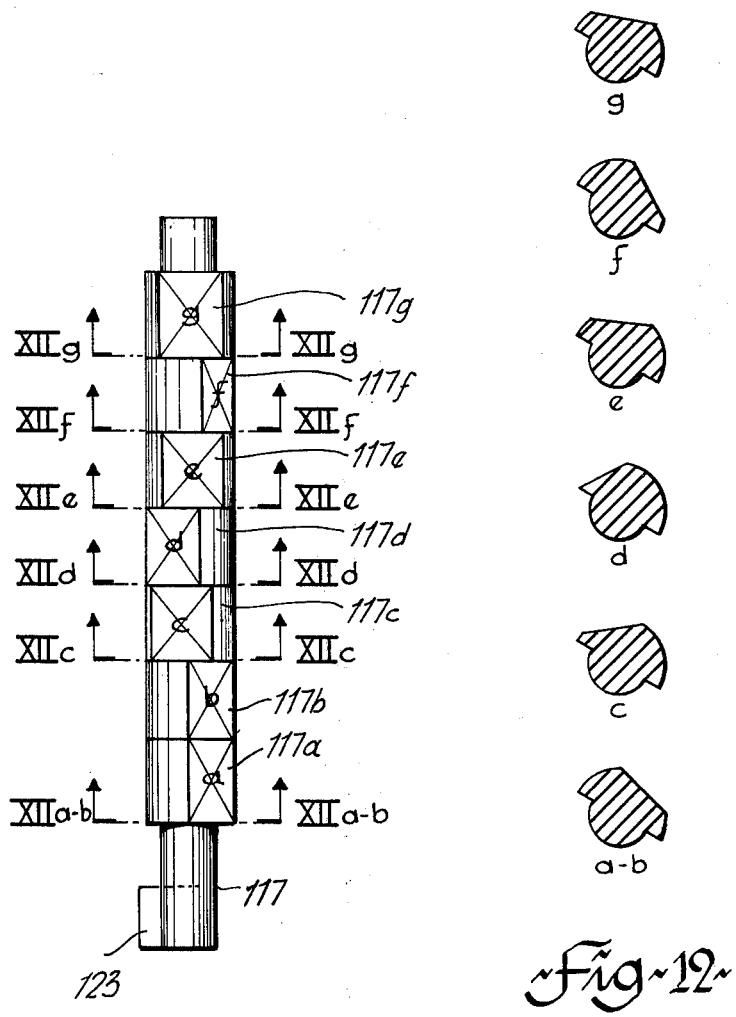

PUSHBUTTON DIALS

This invention relates to pushbutton dials and in particular to pushbutton dials for telephone sets.

Conventional forms of pushbutton dials are composed of a large number of items requiring considerable labour content for assembly. The electrical and electronic components associated with the dial are mounted separately, partly on a separate member attached to the dial and partly in the telephone housing. Considerable wiring is necessary.

In particular, each button contacts actuates at least one set of contacts, hereinafter referred to as frequency contacts, and usually two sets, for the transmission of a discrete frequency or series of frequencies, each button having a unique frequency transmission associated therewith. Wiring is necessary from the contacts to associated electronic components. Also, each button actuates a switch — referred to as a common switch — in which a particular sequence of making and breaking of contacts is carried out.

The present invention is concerned with a pushbutton dial in which the conventional metal mounting plate is replaced by a circuit member, for example a printed circuit board (PCB), the frequency contacts being mounted directly on the circuit member, as are also the other components associated with the dial.

Broadly, the invention provides a pushbutton dial having a cover having a plurality of apertures therein, the apertures arranged in columns and rows, a pushbutton in each aperture, each pushbutton having upper and base portions, and a flange extending peripherally of the pushbutton at the junction of the upper and base portions, a series of longitudinal and transverse shafts pivotally supported on the back surface of the cover, a longitudinal shaft related to each column of apertures and a transverse shaft related to each row of apertures, each of the longitudinal and transverse shafts having a plurality of levers positioned to be engaged by the flanges on the pushbuttons, a lever on a longitudinal shaft and a lever on a transverse shaft associated with each flange; a back member mounted on and spaced from the back surface of said cover; means biasing the pushbuttons away from the back member, the flanges limiting movement of the pushbuttons away from the back member; a circuit member mounted on and spaced from the back surface of said back member; a plurality of pairs of spacing contacts mounted on the back surface of the circuit member, a plurality of pins extending through the back member and circuit member, each of the pins in engagement at a forward end with an extension on one of the longitudinal shafts or one of the transverse shafts, and in engagement at a rearward end with a contact of one of the pairs of spring contacts.

As a further feature, the common switch, which hitherto has comprised a stacked array of cantilevered contact springs — requiring careful adjustment on assembly to ensure correct operating sequence — is replaced by a switch composed of a plurality of contact springs mounted flat on the PCB, side by side, the contact spring actuated by a cam member. The cam member can readily be manufactured to accurate dimensions and displacements and adjustment at assembly is avoided. An operating member in the dial assembly actuates the cam member.

Thus, in a particular form of the pushbutton dial, including a common switch, there is provided an operating member supported between the back member and the circuit member, the operating member slidable longitudinally and including a series of projections extending through the back member, each projection in association with a related lever on a separate one of the transverse shafts; a common switch mounted on the back surface of the circuit member, the common switch including a series of spring contacts; a further extension on the operating member extending through the circuit member, and actuator means extending between the further extension on the operating member and the common switch, for actuation of the series of spring contacts on longitudinal sliding of the operating member.

This invention will be readily understood by the following description of an embodiment, by way of example, in conjunction with the accompanying drawings, in which:

FIG. 8 is a view of an assembled dial, as in FIGS. 1 to 7 in the direction of arrow A in FIG. 5;

FIG. 9 is a plan view of the common switch, as in FIG. 7, to a larger scale;

FIG. 10 is a side view of the common switch in the direction of arrow B in FIG. 9;

FIG. 11 is a plan view of the cam member as in the switch of FIGS. 9 and 10;

FIG. 12 is a series of cross-sections on the lines XIIa—XIIa to XIIg—XIIg respectively of FIG. 11.

Figure 1:
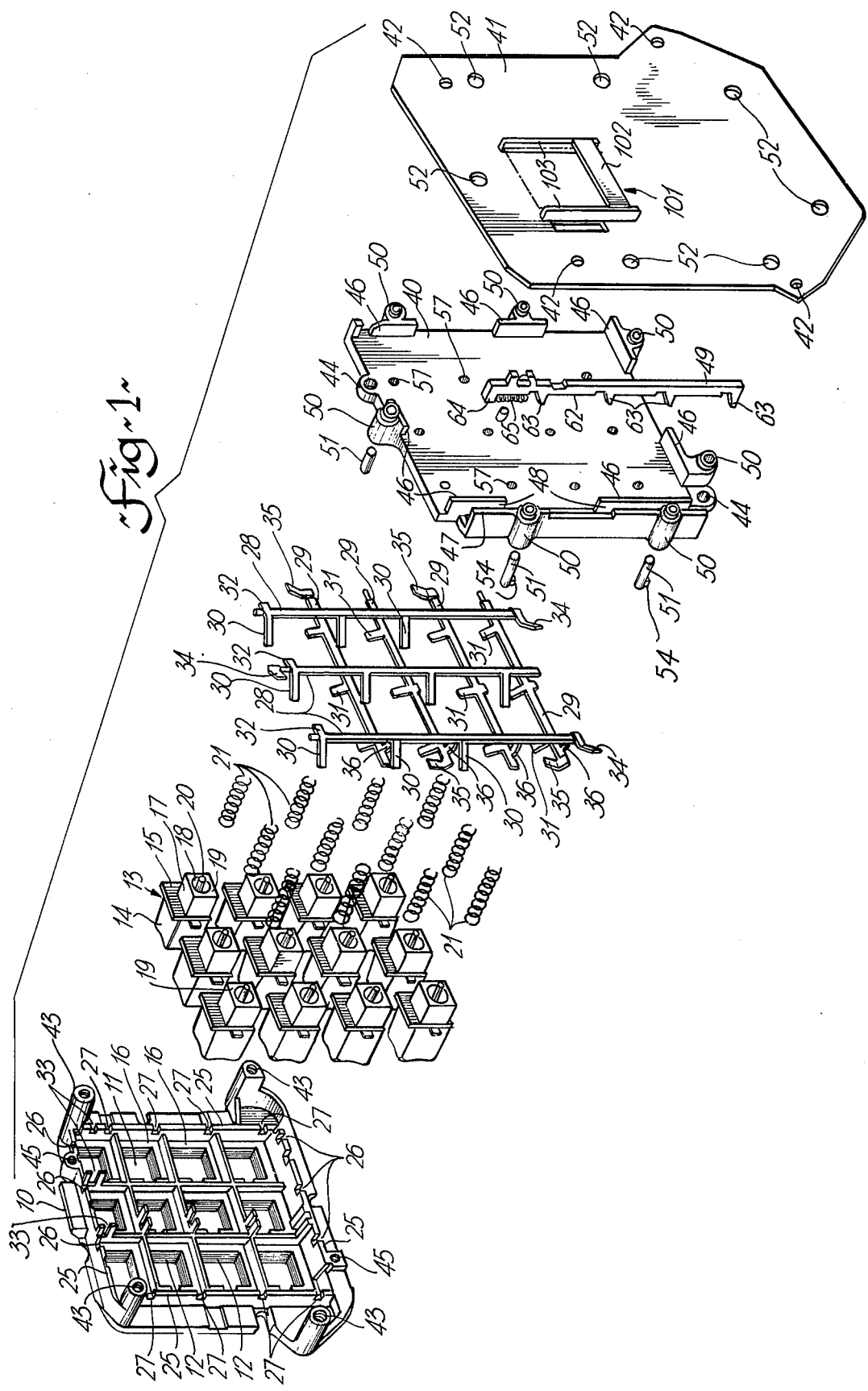
FIG. 1 is an exploded view of a dial, with contacts, common switch and electrical and electronic components omitted.
Figure 2:
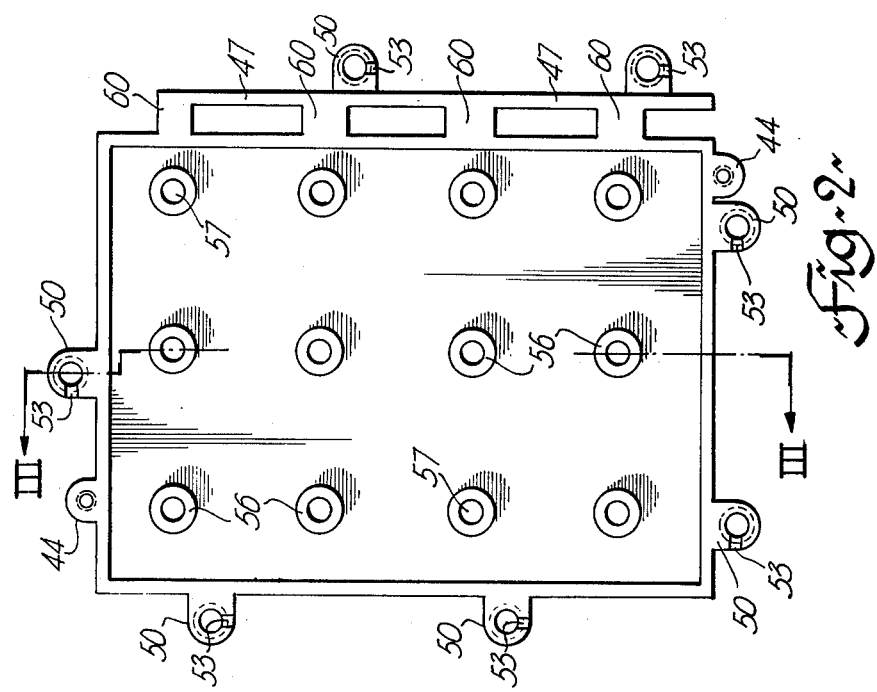
FIG. 2 is a plan view of the top or front surface of the back member, part of the assembly of FIG. 1, in more detail.
Figure 3:
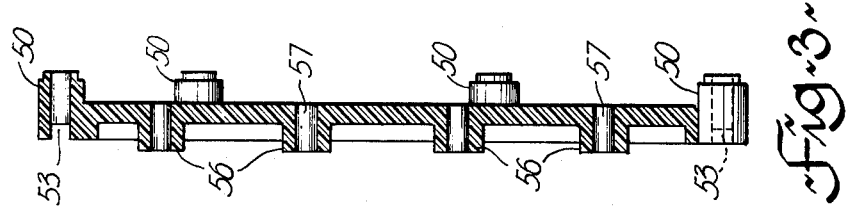
FIG. 3 is a cross-section on the line III—III of FIG. 2.
Figure 4:
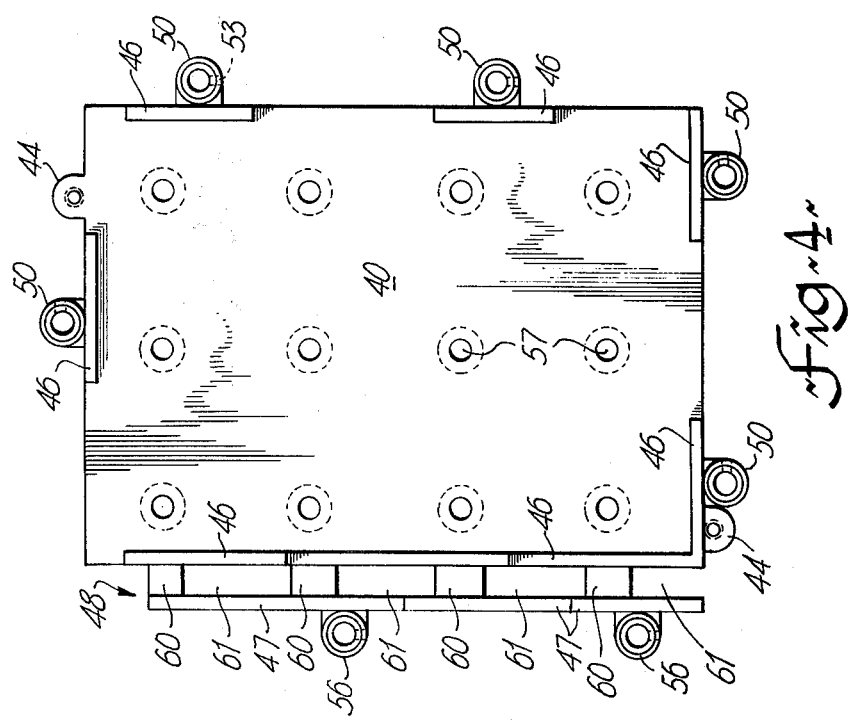
FIG. 4 is a view on the bottom or back surface of the back member of FIGS. 1, 2 and 3.

As illustrated in FIGS. 1, 2 and 3 the dial is composed of a cover 10 having a series of square apertures 11 therein. In the particular example, twelve apertures are provided in three columns each of four apertures, that is four rows. Other arrangements can be provided, and one normal arrangement has ten apertures with the centre column having four apertures and the side columns each having three apertures.

Each aperture 11 has an upwardly extending rim 12, on the front surface of the cover, to act as a guide for a pushbutton. A plurality of pushbuttons 13 — twelve in the present example — are positioned in the cover 10, one button in each aperture 11. Each button has a square cross-section upper portion 14 which is positioned in, and is a sliding fit in the related aperture 11. A flange 15 extends for the major part of the periphery of each button, being received in a suitably shaped recess 16 at the base of each aperture 11. The base portion 17 of each button is also of square cross-section, but of somewhat smaller dimensions than the upper portion 14 and has a central axial bore 18 extending upward from the bottom surface 19. A pin 20 is positioned on the axis of each bore 18, extending from the bases of the pushbuttons. A compression spring 21 is positioned in each bore 18 and extends therefrom.

The back surface of the cover 10 has a peripherally extending wall or rib 25. In the wall 25 are two series of notches 26 and 27. Notches 26 are in the portions of wall 25 conveniently referred to as the top and bottom portions and act as bearings and locating formations for three longitudinal shafts 28. Notches 27 are in the side portions of the wall 25 and act as bearings and locating formations for four transverse shafts 29. The top and bottom portions of the wall 25 extend further than the side portions and the notches 26 have their bases further from the front surface of the cover 10 than notches 27. By this means the longitudinal shafts 28 are supported and positioned behind the transverse shafts 29 relative to the front face of the cover.

The longitudinal shafts 28 each have a series of levers 30 and transverse shafts 29 each have a series of levers 31. The shafts 28 and 29 extend relative to the columns and rows respectively of the pushbuttons 13 and the arrangement is such that depression of a pushbutton rotates one longitudinal shaft and one transverse shaft by engagement between the flange 15 on the button with the related levers 30 and 31; a unique pair of longitudinal and transverse shafts being rotated by each pushbutton.

At the top end of each longitudinal shaft is a short extension 32 which engages with a slot 33 adjacent to the top portion of the wall 25 and acts to maintain the shaft in correct longitudinal position. Also each longitudinal shaft has a contact actuating lever 34 at one end — in the present example at the top end for the centre shaft and at the bottom end for the outer shafts.

The transverse shafts 29 have a contact actuating lever 35 at one end — the end varying with the particular shaft. A further lever 36 is provided at the same end of each transverse shaft — the left hand end as viewed in FIG. 1.

Attached to the cover 10 is a back member 40, and a printed circuit board 41. Back member 40 and PCB 41 are attached by screws, (74 in FIG. 7), passing through holes 42 in the PCB into bushes 43 on the back of the cover 10, the back member sandwiched between the cover 10 and PCB 41 and located and held in position by further screws — not shown — passing through bushes 44 on the back member into bushes 45 on the cover 10. The PCB 41 rests on the back surfaces of webs 46 extending from the back surface of the back member 40, thus forming a space between back member and PCB. On one side of the back member 40 there is an additional web 47 spaced from the webs 46 and parallel thereto to form a guiding and support channel 48 for an operating member 49. Also formed as parts of the webs 46 and 47 are a series of bushes 50. The bushes 50 are so positioned that a bush is aligned with each lever 35 on the transverse shafts 29 and with each lever 34 on the longitudinal shafts 28.

Positioned in each bush 50 is an axially sliding pin 51. The upper end of each pin, in the assembled dial, rests on the associated lever 34 or 35. The lower end of each pin, and also the lower end of each bush 50 extend through holes 52 in the PCB as seen in FIG. 8. A protrusion 54 on the upper end of each pin 51 prevents the pins from passing right through the bushes.

As seen in FIGS. 2 and 3, a recess 53 is provided in the wall of each bush 50 at the upper or forward end to permit the related lever 34 or 35 to push the pin 51 axially in the bush. On the upper or forward surface of the back member 40 are a series of bushes 56, a bush aligned with each pushbutton 13. The pins 20 extend into the bores 57 of the bushes 55. The ends of the compression springs 21 rest on the upper or front surfaces of the bushes 56.

The web 47 is attached to the main part of the bush member 40 by short flat sections 60, defining four apertures 61, three enclosed and one open at one end. The operating member 49 slides in the channel 48 formed by the web 47 and adjacent web 46. From the top, or forward, edge 62 of the operating member 49 — to the left in FIG. 1 extend four projections 63. Projections 63 extend through the apertures 61 and are engaged by the levers 36 on each of the transverse shafts 29. The operating member also has an extension 64 at its upper end, and a compression spring 65 is positioned between this extension 64 and the end of the upper flat section 60. Actuation of the operating member occurs by pressing on any pushbutton which in turn rotates one of the transverse shafts 29. Rotation of any shaft 29 causes the related lever 36 to push against the related projection 63 and slides the operating member downward in FIG. 2.

Sliding of the operating member 49 actuates a common switch 70 mounted on the PCB via a member extending through a slot in the PCB, as will be described. Various forms of suitable common switches are described, and illustrated, in copending application, Ser. No. 688,382, now abandoned, in the name of the present assignee. The particular form illustated in FIG. 7 will be described in more detail later.

Figure 7:
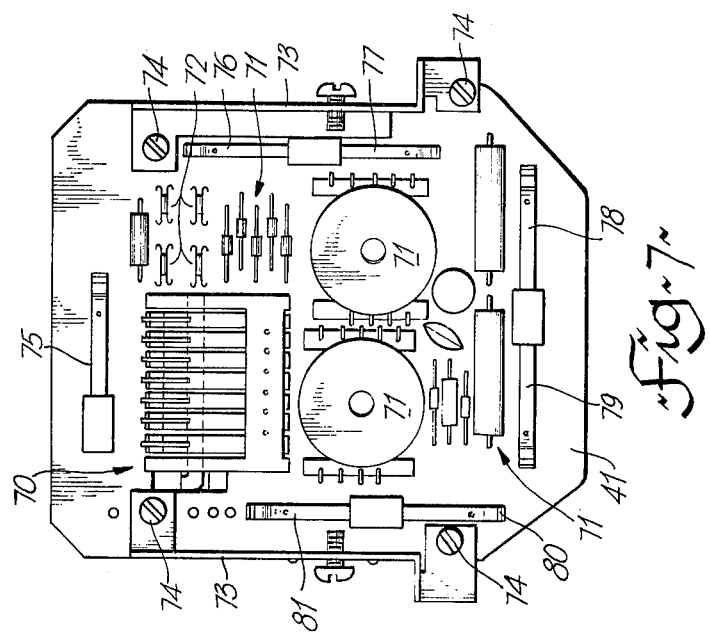
FIG. 7 is a base view of the dial of FIGS. 1 to 6 with the contacts, common switch and electrical and electronic components mounted thereon.
Figure 6:
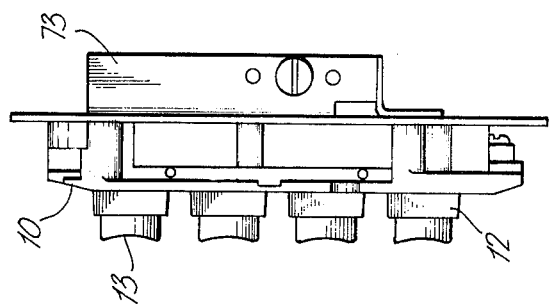
FIG. 6 is a side view of the assembled dial of FIG. 1.
Figure 5:
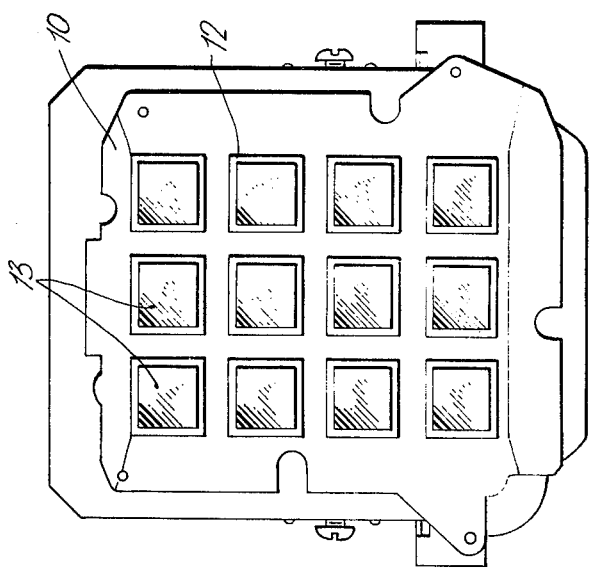
FIG. 5 is a top view of the assembled dial of FIG. 1.

The assembled dial is illustrated in FIGS. 5, 6 and 7. The common switch is indicated at 70 in FIG. 7, while various electrical and electronic components are also indicated generally at 71, being mounted on the PCB 41. Terminals 72 are provided for connection of the dial to the telephone line. Brackets 73 are attached to opposite sides of the dial, by the screws 74 holding the assembly of PCB, back member and cover together, the brackets serving to mount the dial in the telephone set or other apparatus.

Also mounted on the PCB are a plurality of spring contact assemblies 75, 76, 77, 78, 79, 80 and 81. In the present example, in three instances a pair of contact assemblies use a common mounting, forming pairs of contact assemblies on three sides i.e. contact assemblies 76 and 77; 78 and 79; 80 and 81. A single contact assembly 75 is on the fourth side. Also the pair of contact assemblies 76 and 77 are offset toward the top of the dial assembly relative to the pair of contact assemblies 80 and 81. By this means the contact assemblies 76, 77, 80 and 81 each relate to a particular one of the transverse shafts. Contact assembly 75 is actuated by the central longitudinal shaft and contact assemblies 78 and 79 by the outside longitudinal shafts.

FIG. 8 illustrates in more detail the actuation of the contact assemblies 78 and 79. Each contact assembly comprises two spring contacts. Considering assembly 78, there are two spring contacts 85 and 86. The contacts are mounted at one end on the PCB 41 by attachment means indicated at 87 - which, in the particular example is common to the assembly 79. Contact 85 is biased towards the PCB and has a forward end 88 which rests on the back surface of the PCB. Contact 86 is also biased towards the back surface of the PCB and is in contact with the end of the pin 51. Pin 51 is acted upon by the actuating lever 34 on longitudinal shaft 28, as previously described. Depression of a pushbutton in the left hand column — considering FIG. 8 — will rotate the left hand longitudinal shaft 28 and rotates the lever 34 - clockwise in FIG. 8. This pushes down the related pin 51 which in turn pushes down the spring contact 86. Contact 86 makes electrical contact with contact 85. A dimple contact area 88 is formed on the contact 85 to provide a good contact condition. Release of the pushbutton reverses the actuation and contact is broken.

Contact assembly 79 is actuated in a similar way. Depression of a pushbutton in the right hand column rotates the right hand longitudinal shaft 28, rotates actuating lever 34, moves pin 51 and pushes down spring contact 90 into contact with spring contact 91. Contact 90 and 91 are similar in form to contact 86 and 85 respectively, with contact 91 having a formed end 92 and a dimple formation 93.

Spring contacts 86 and 90, in the present example, are separate while spring contacts 85 and 91 are a single member. This arrangement can be reversed, and also the spring contacts 85 and 91 can be independent of each other as well as spring contacts 86 and 90. The ends of the spring contacts 86 and 90 pass up through the PCB 41, at 92, and are connected to the circuit on the PCB. Spring contacts 85 and 91 also have a tang, not shown, which passes up through the PCB and connected to the printed circuit. The printed circuit is indicated, for illustrative purposes only, at 95.

The other spring contact assemblies 75, 76, 77 and 80 and 81 are actuated in a similar manner. Only the one contact assembly 75 is at the top edge of the dial assembly and is actuated by the central longitudinal shaft 28. The contact assemblies 76 and 77 are actuated by the first and third transverse shafts 29 respectively counting from the top of the dial assembly — and contact assemblies 81 and 80 are actuated by the second and fourth transverse shafts 29 respectively. Thus depression of a pushbutton 13 actuates one of the contact assemblies 75, 78 and 79, and one of contact assemblies 76, 77, 80 and 81. There is a unique selection for each pushbutton.

The various electrical and electronic items 71 and 72 are also connected to the circuit on the PCB 41, by tangs or leads passing through holes in the PCB, in the conventional manner.

The common switch 70 is illustrated in more detail in FIGS. 9, 10, 11 and 12.

FIGS. 9 and 10 illustrate a switch assembly having seven spring contacts 100a-100g mounted in a support member 101. Support member 101 is conveniently of molded electrically insulating material and of U shaped form comprising a base portion 102 and spaced apart legs 103. The contact springs 100 are clamped towards one end on the base portion 102 by clamping member 104 fastened by screws 105. The clamping member 104 is also of electrically insulating material. In FIG. 10 one of the legs 103 of the support member 101 is omitted to show the contact springs. The support member 101 is arranged to clip onto the PCB 41. To this end an extension 107 is formed on the base portion 102 and an extension 108 is formed at the end of each leg. The extensions 108 are hooked shaped and are first inserted through apertures 109 in the PCB after which the support member 101 is pushed down and the extension 107 pushed through an aperture 110 in the PCB. Extension 107 has a protrusion 111 which engages under the PCB, the extension 107 flexing as it passes through the PCB. In FIG. 1, the support member 101 is shown in position on the PCB 41.

Formed in each leg toward the end thereof is a recess 115, the recess extending from the base surface of the support member, which base surface is in contact with the PCB. Each recess 115 has a semicircular end 116 and acts as a bearing for a cam member 117. The cam member is positioned in the recesses 115 before the support member is attached to the PCB 41. At the ends where the contact springs are clamped the contact springs are bent downward, at 118 and extend through the PCB 41. The free ends of the contact springs are bent down and then the extreme ends bend round and up to form curves or rounded contacts 120a-120g. The ends are bifurcated and each portion of the contact is dimpled, at 121, to give a good contact surface. Contacts 122a-122g are inserted in the PCB 41.

The cam member 117 has a radial extension 123 at one end which is positioned in a slot 124 in the PCB 41. Positioned beneath the PCB 41 is an operating member 49. Member 49 is reciprocated, as indicated by arrow B and as previously described, by actuation of the levers 36 rotated by the pressing of any one of the pushbuttons of the dial. Extending upward from the operating member is a pair of spaced apart members 125, the members 125 spaced apart along the longitudinal axis of the operating member 49 and defining a recess 126 in which is recessed the radial extension 123 on the cam member 117.

Reciprocation of the operating member 49 rotates the cam member 117 by interengagement between the members 125 and the radial extension 123. The cam member 117 is illustrated in more detail in FIGS. 11 and 12. FIG. 11 a plan view and FIG. 12 showing the cam forms at different positions along the cam member. As seen in FIGS. 11 and 12 the cam member is positioned with the radial extension 123 inclined downwardly and to the left as viewed in the direction of arrow X in FIG. 9. There are seven cam surfaces but in the present example the two end sections between section lines XIIIa and XIIIb are the same.

In this example illustrated, all the contact springs are biased to cause the contacts 120a-120g to be in contact with contacts 122a-122g unless deliberately lifted up by a cam surface. In a common switch for a pushbutton dial, in the inactivated condition, that is with no pushbutton depressed, certain contacts will be held in a "normal open" condition and others will be in a "normal closed". As a pushbutton is pressed, the cam member 117 is rotated — anticlockwise as seen in FIG. 10 and in FIGS. 11 and 12 — and a sequence of closing and opening contacts occurs.

Considering FIG. 9 with FIGS. 11 and 12, in the initial inactivated condition, contacts 120a and 120b are open; contacts 120c, 120d and 120e are closed; contact 120f is open and contact 120g is closed. Each contact spring is resting on the related cam surface of the cam member 111. The profiles of the cam surfaces 117a and 117b are the same and are such that the contacts springs 120a and 120b are lifted up out of contact with the related contacts 122a and 122b. The profiles of the cam surfaces 117c, 117d and 117e are such that the contact springs 120c, 120d and 120e are in their downward position in contact with contacts 122c, 122d and 122e, the contact springs resting on flat portions of the cam surfaces. However it will be noted that these flat portions are in differing relative angular dispositions and this provides for varying times of lifting of the contact springs as the cam member 117 rotates. Contact spring 120f is lifted by cam surface 117f and contact spring 120g is in a downward position on the cam surface 117g. It is the angular disposition of the flat portions of the cam profiles, relative to each other and to the radial extension 123, which determines the particular contact condition of each contact spring and the related opening and/or closing of contacts.

As the cam member 117 rotates contact 120d opens followed very closely by the closing of contacts 120a and 120b. Then contact 120c opens followed by the closing of contact 120f. Contact 120e then opens followed finally by the opening of contact 120g. Release of a depressed pushbutton reversed rotation of the cam member 117 with the reverse actuation of the contacts 120a–120g.

As the contact springs are formed by conventional methods, that is by punch and die, the dimensional accuracy is quite high. The contacts 122 can be manufactured to quite close tolerances very cheaply and easily and the cam member is reproduced quite cheaply ad easily by molding. Once assembled, the contact springs, cam member and contacts are in a predetermined positional relationship and no final adjustment of the contact springs is necessary after assembly.

What is claimed is:

1. A pushbutton dial comprising:
   a cover having a plurality of apertures therein, said apertures arranged in columns and rows;
   a pushbutton in each aperture, each pushbutton having an upper portion, a base portion and a flange extending peripherally of the pushbutton at the junction of said upper and base portions, said upper portion a sliding fit in said aperture and guided thereby;
   a series of longitudinal shafts pivotally supported on the back surface of the cover, a longitudinal shaft related to each column of apertures;
   a series of transverse shafts pivotally supported on the back surface of the cover, a transverse shaft related to each row of apertures;
   each of said longitudinal and transverse shafts having a plurality of levers positioned to be engaged by said flanges on said pushbuttons, a lever on a longitudinal shaft and a lever on a transverse shaft associated with each flange;
   an extension on one end of each longitudinal shaft and each transverse shaft, said extensions alternating at said ends of said shafts;
   a back member mounted on and spaced from the back surface of said cover;
   spring means positioned between each pushbutton and said back member and biasing said pushbutton away from said back member, said flange limiting movement of said pushbutton away from said back member;
   a plurality of bushes in said back member adjacent to the periphery thereof, a bush aligned with each of said extensions on said shafts;
   a pin axially slidable in each bush, each pin in engagement at a forward end with one of said extensions on said shafts;
   a circuit member mounted on and spaced from the back surface of said back member;
   a plurality of pairs of spring contacts mounted on the back surface of said circuit member adjacent the periphery thereof, a pair of contacts associated with each bush and related pin;
   said pins extending through holes in said circuit member, a rearward end of each pin in engagement with a contact of one of said pairs of spring contacts.

2. A dial as claimed in claim 1, including;
   an operating member supported between said back member and said circuit member, said operating member slidable longitudinally and including a series of projections extending through said back member, each projection in association with a related lever on a separate one of said transverse shafts;
   a common switch mounted on the back surface of said circuit member, said common switch including a series of spring contacts;
   a further extension on said operating member extending through said circuit member, and
   actuator means extending between said further extension on said operating member and said common switch, for actuation of said series of spring contacts on longitudinal sliding of said operating member.

3. A dial as claimed in claim 1, said base portion of each of said pushbuttons including an axial bore and a pin positioned in said axial bore and extending therefrom, said spring means comprising a compression spring positioned in said axial bore around said pin, and a plurality of apertures in said back member, an aperture aligned with each pin, the rearward ends of said pins extending into said apertures in said back member.

4. A dial as claimed in claim 2, said operating member slidably supported in a channel formation at side edge of said back member, said channel formation comprising first and second parallel spaced apart webs extending normal to the back surface of said back member, said first web extending along said side edge and said second web attached to said edge by a plurality of sections, said sections and said first and second webs defining apertures through which extend said series of projections on said operating member.

5. A dial as claimed in claim 1, said circuit member comprising a printed circuit board, electronic components preassembled on said printed circuit board prior to attachment to assembly of said dial.

6. A dial as claimed in claim 1, said common switch comprising:
   a support member;
   a plurality of cantilever spring contacts mounted side by side on said circuit member, each spring contact including a spring contact portion;
   a plurality of contact areas on said circuit member, a contact area under each contact portion;
   an elongated cam member, movably mounted on said circuit member adjacent said spring contacts, the longitudinal axis of the cam member extending transversely of said spring contacts;
   cam surfaces on said cam member, a cam surface associated with each of said spring contacts for actuation thereof,
   means on said cam member for actuation by said operating member of said pushbutton dial, to move said cam member and engage said cam surfaces with said spring contacts in a predetermined sequence.

7. A dial as claimed in claim 6, said spring contacts biased toward said circuit member, said cam member moveable beneath said spring contacts and said cam surfaces operative to lift and lower said spring contacts relative to said circuit member to disengage said contact portions from, and engage said contact portions with, said contact areas in a predetermined sequence.

8. A dial as claimed in claim 7, said cam member mounted for rotation about its longitudinal axis, said cam surfaces having predetermined rotational angular relationships relative to each other.

9. A dial as claimed in claim 8, said means on said cam member for actuation by said operating member comprising a radial extension extending to engage with said further extension on said operating member.

10. A dial as claimed in claim 3, said spring contacts each mounted at one end in a contact support member, the spring contacts extending side by side from said contact support member, said contact portions formed on the ends of said contact springs remote from said contact support member, said cam member mounted intermediate the contact support member and said contact portions.

* * * * *